Oct. 26, 1937.  F. HOLWECK  2,097,156
GRAVITY PENDULUM
Filed Oct. 10, 1934
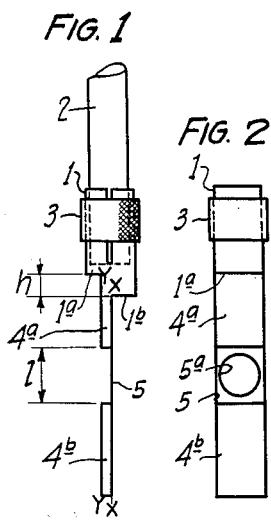
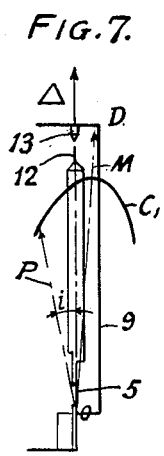
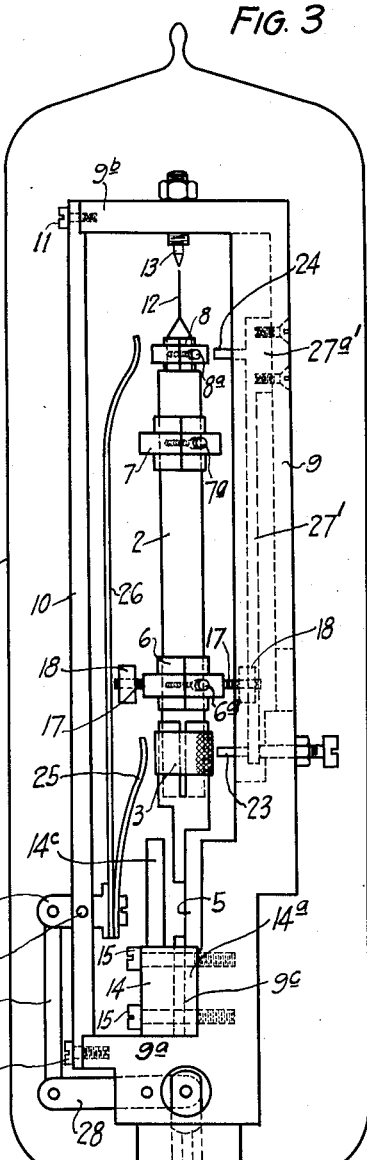
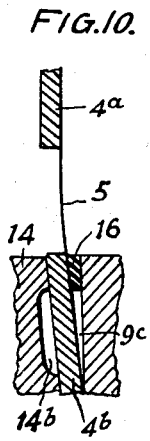
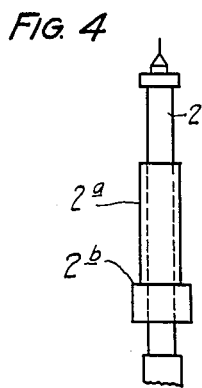
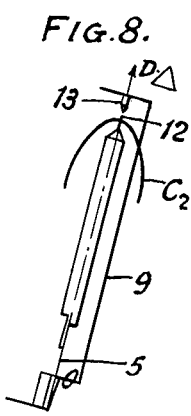
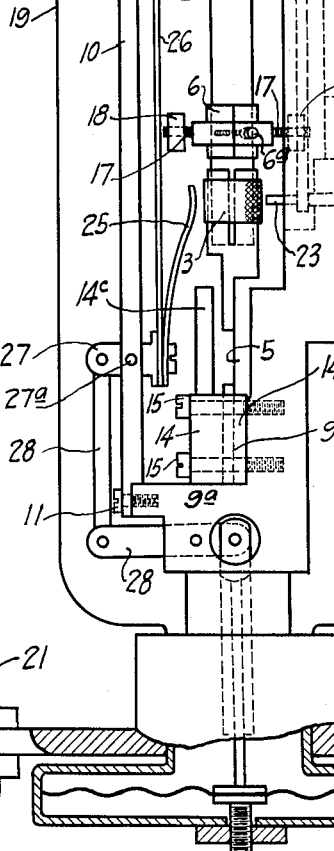
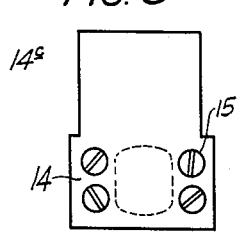
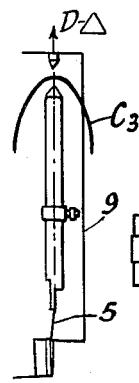
Inventor
Fernand Holweck
By their Attorney Patented Oct. 26, 1937

2,097,156

UNITED STATES PATENT OFFICE 2,097,156

GRAVITY PENDULUM

Fernand Holweck, Paris, France, assignor to Shell Development Company, San Francisco, Calif., a corporation of Delaware Application October 10, 1934, Serial No. 747,721
In France October 12, 1933

6 Claims. (Cl. 265—1.4)

In measuring the intensity of gravity, so called "elastic" pendulums are used. A pendulum of this type is provided with an elastic strip which is vertical or substantially vertical in its mean position. One end of the elastic strip is fixed while on the other end is mounted a weight so that the pendulum is capable of oscillating around a pseudo-axis similar to that of a metronome around its pivotal axis. The period of oscillation is a function of the elastic characteristics of the strip as well as a function of the intensity of gravity at the place where the measurement is made.

Therefore, if the instrument is first operated at a place where the intensity of gravity is exactly known, calibration of the instrument, that is, the determination of the coefficients of the above-mentioned function can be made, so that the measurement of gravity at any other place can then be made by measuring the period of oscillation at that place.

It is of course necessary that the elastic characteristics of the strip used remain the same. Strips cut from a block of a nickel alloy, known under the name of "Elinvar" which contains approximately 36% nickel, 12% chromium and 52% iron have been found satisfactory. The elastic characteristics of the above alloy strips are practically independent of temperature changes over a considerable range.

The present invention has for its object the improving of apparatus of the above type so that the present known causes of error are eliminated. Another object is to render it possible for the gravity observations to be made more rapidly and with more accuracy than with existing apparatus.

This invention further provides an arrangement for allowing the instrument to be carried in a convenient and compact manner so that jolts, shocks and vibrations are practically without effect on the very sensitive and delicate parts of the instrument.

The apparatus according to the invention will be described below with reference to the accompanying drawing which represents by way of example one form the invention and in which:

Figures 1 and 2 represent respectively the side and face views of the piece forming the elastic strip of the pendulum.

Figure 3 is a side view of the pendulum and its fixed mounting.

Figure 4 is a side view of part of the pendulum showing a variation in the method of mounting the weight thereon.

Figures 5 and 6 are side and vertical sectional views of the block for fastening the lower end of the pendulum.

Figures 7, 8 and 9 are diagrams with reference to which the mechanism for regulating the mean position of the pendulum will hereinafter be described.

Figure 10 is a diagram on an enlarged scale showing the part used to regulate the mean position of the pendulum.

As has been stated above the elastic strip of the pendulum is cut from a block of a material the modulus of elasticity of which varies as little as possible with temperature changes. Since this strip must have perfectly defined geometric shapes and since on the other hand it is necessary that the chuck which insures a union of the strip and the shaft of the pendulum as well as the base by which the shaft is fastened be included in the same piece as the strip, the invention provides the following arrangement for the different elements. Referring to Figures 1 and 2 a split chuck I is machined from a bar of "Elinvar". The chuck I is designed to receive the shank 2 of the pendulum, the assemblage being held by a collar 3. Next a face which will serve as a reference for machining the strip is set at the base of the chuck in an axial plane XX. Another face in plane YY for the same purpose is then set parallel to XX. The said two faces XX and YY join the base of the chuck respectively by shoulders $1a$ and $1b$. These shoulders have between them an offset of a height $h$ such that the asymmetry which results thereby brings the center of gravity of the finished piece back in the axial plane XX notwithstanding the presence of material on one side only of plane XX.

The elastic strip 5 is obtained, by reducing by precise machining, the material between the planes XX and YY for a distance $l$. The strip 5 terminates in the thicker pieces $4a$ and $4b$.

The elasticity of the strip 5 may be increased by making a hole through the strip as shown at $5a$ in Figure 2. This hole although shown as circular may be square, or any other suitable shape.

The shank 2 of the pendulum may be made of fused quartz or any other suitable material, the choice of which is guided by considerations which will be hereinafter explained. If quartz or other insulating material is used for the shank 2, the surface can be made a conductor of electricity by covering it with platinum, silver or other suitable metal so that any frictional electricity which may be generated on the pendulum by the stops which limit the pendulum's movement can be grounded.

Referring to Figure 3 the shank 2 carries one or more metal weights 6, 7 and 8 which are split and held in position by the clamping screws 6a, 7a and 8a.

One of the weights as, for example 8, can serve as a contact member for the supporting bearings which will be hereinafter described.

The characteristics of the shank 2 and the method of mounting the mass or masses will be determined according to the thermal coefficient of the elastic modulus of the strip 5, a thermal coefficient which may have a value either positive or negative according to the specimens of metal used.

Fused quartz can be used for making the shank 2 if the modulus of the strip is zero or negative. If the thermal coefficient of the elastic modulus is zero, then the weights 6, 7 and 8 are attached to the fused quartz pendulum shaft directly and no compensation means are necessary. However it may happen that the particular strip has either a positive or negative thermal coefficient. If the thermal coefficient is negative the weights are mounted on the shaft through the intermediary of metallic tubes such as 2a of Figure 4 which change their lengths upon a change in temperature. The weights are attached to the tubes at the lower ends as shown at 2b in Figure 4. The tubes are fitted over the shank 2 and fastened to the shank only at their upper ends. It will thus be seen that the positions of weights on the shaft may be changed, compensating for changes in elasticity due to the thermal elastic coefficient of the strip being negative. If the thermal coefficient is positive then the weights may be mounted directly on a non-magnetic metallic shaft instead of on a quartz shaft, the metallic shaft having such coefficient of expansion that the weights will be moved upon a change in temperature closer to or farther away from the fulcrum to compensate for the change in the elastic characteristics of the pendulum resulting from the change in temperature. As an example of a suitable shaft a thin tube of alloyed platinum could be used.

By the use of a suitable combination of the above arrangements an important cause of error, namely that due to temperature changes is reduced, for it must be realized that no material suitable for an elastic strip has elastic qualities entirely independent of temperature changes. Even if the material known as "Élinvar" is used the elastic characteristics of the strip can vary with the temperature and one strip may vary from another.

Furthermore, the piece of metal from which the elastic strip 5 is formed is subjected, after being machined, to a thermal treatment designed to make it homogeneous and to prevent variations of its elastic characteristics with time. This thermal treatment, similar to that to which spiral springs for chronometers are subjected, for which "Élinvar" is also used, consists essentially in heating the metal to a temperature of about 250° C. The duration of the heating and the subsequent cooling should be prolonged over several weeks or several months if possible.

The pendulum is rigidly fastened at its lower end by clamping the part 4b by means of a block 14 to a suitable frame 9. The frame 9 is heavily ribbed so as to provide as great rigidity as possible. The end brackets of the frame 9a and 9b are braced by a member 10, attached to the end portions by screws 11 or by other means so that the member 10 may be readily removed in order that access to the pendulum can be had. A very fine quartz thread 12 is attached to the upper end of the shank 2. This thread cooperates with a fixed reference mark on the bracket 9b consisting of a point 13. When the pendulum is at rest the thread 12 lies directly under the point 13.

As stated above the pendulum is assembled in the frame by clamping the part 4b to the lower part of the frame. More particularly the part 4b of the pendulum is clamped between a vertical post 9c of the frame 9 and a block 14 by means of screws 15. The block 14, details of which are shown in Figures 5 and 6, is provided with two elongated sides 14a which fit over corresponding lateral faces of the post 9c. By this means of mounting undue torsion strain on 4b is avoided.

The following arrangement has been provided for the regulation of the rest position of the pendulum.

It is known that the period of oscillation of the elastic pendulum varies with the inclination of the frame. The law which the variation follows can be expressed by a curve such as $c_1$, (shown in Figure 7) fixed by polar coordinates. Measuring from a pole O gives the value P of that period for the different values of the angle $i$ which the rest position of the pendulum makes with an original direction fixed with relation to the frame e. g. the direction $\Delta$ through the point 13.

Now if without special care the apparatus is regulated by means of leveling screws so that the points 12 and 13 lie in approximately vertical alignment when the pendulum is in a position of rest, the curve may have a shape such as $c_1$ showing a maximum M for a direction D different from $\Delta$ and its slope with reference to the direction $\Delta$ will be very considerable.

It will thus be seen that a very slight displacement of the frame from the vertical and consequently the rest position of the moving part from $\Delta$ has a very important disturbing influence on the value of the period of oscillation of the pendulum and creates a source of serious errors. Such slight errors in adjusting the apparatus cannot be avoided due to the extreme sensitivity of the apparatus. According to this invention means are provided for making D and $\Delta$ coincide so that the variations of the period of oscillation on both sides of $\Delta$ are considerably diminished.

In order to bring about this condition two means are provided for adjusting the apparatus, one in such a way that for a given orientation of the frame D and $\Delta$ coincide and the other in such a way that this orientation of the frame is that for which $\Delta$ is vertical.

The first adjustment is made by introducing a wedge 16 between the part 4b of the pendulum and the frame. This wedge has the effect of deflecting the strip as is shown on an exaggerated scale in Figure 10 and of modifying the position of the rest of the pendulum.

Referring to Figure 10 it will be seen that the bearing surface of the block 14 has a groove 14b which avoids the necessity of accurately planing a larger flat surface than necessary and insures the contact of part 4b against the block 14 at two definite points i. e. opposite the wedge 16 and opposite the base of the bearing 9c.

By the above means the position of the curve characteristics of the periods of oscillation in relation to the frame can be changed so that it is possible by means of a wedge 16 of suitable thickness to make D and Δ coincide for a particular orientation of the frame, for example as in Figure 8.

After the above adjustment has been made the common direction D, Δ is brought to the vertical. To bring this about the weights of the pendulum are so adjusted that the position of rest of the pendulum D, is displaced with reference to the frame. It is restored to coincidence with Δ while adjusting the frame so that Δ is vertical.

The desired position shown in Figure 9 is thus obtained, in which the curve $c_3$ is symmetrical with respect to the perpendicular Δ, D. This curve has a horizontal tangent at its point of intersection with the perpendicular Δ, D so that the causes of errors due to lack of equilibrium of the apparatus are reduced to a minimum.

The weights on the pendulum are modified by means of small weights 18 screwed onto small threaded pins 17 as shown attached to weight 6 in Figure 3.

By adjustment of these weights, which may be only on one side or on both sides of the pendulum in its plane of oscillation, the desired value to the torsion couple communicated to the pendulum can be given.

The above modification of the pendulum can also be brought about by using on the pendulum one or more weights made of two metals of different densities, in which case the plane of separation of the two metals passes through the axis of the shank 2.

Referring again to Figure 3; in order that the temperature of the elastic strip 5, may be accurately determined by the reading of a thermometer (not shown) carried on the frame, the said elastic strip is in a thermal shield comprising an extension 14c from the bearing block 14.

The whole instrument described above is contained in a glass tube 19, in which there is a very high vacuum to prevent damping of the vibrations by means of the air. For the same purpose, the different parts are carefully cleaned to avoid the presence of oil vapours inside said tube 19.

The unit is attached to a base 20 which rests, through the leveling screws 21, on a triangular base. The apparatus also carries means permitting the fastening of the moving part and protecting the strip 5 from any effect of shock during transportation. The particular means used has two V-shaped bearing surfaces: 23 and 24 which cooperate respectively with the tightening collar 3 and with the pendulum weight 8, and against which the latter two elements are held in position for transportation by the spring strips 25 and 26.

The support 23 is attached to the lower end of a bar 27' attached to the frame 9 at its upper end, 27a'. The metal constituting this bar is selected so that its thermal expansion exactly compensates for the difference between those of the pendulum and of the frame 9, so that whatever the temperature, no relative displacement of the support 23 and of the collar 3 takes place. In carrying position, the spring strip 25 firmly presses the collar 3 against its support, and in addition the relative sliding of these elements is prevented, for example by sanding, milling etc. of the collar 3. Due to this arrangement the strip 5 is held firmly, while remaining free to expand under the effect of temperature variations.

The surfaces of the pendulum weight 8 and of its holder 24 are on the contrary such that they can easily slide on each other under the effect of temperature variations to prevent any longitudinal strain on the pendulum, and the strip 26 presses the weight 8 against its support with a pressure just sufficient to prevent its free movement without impeding this relative sliding.

The two strips 25 and 26 are mounted on a common arm 27 pivoting about an axis 27a carried by the removable post 10; this arm 27 is actuated by an articulated control mechanism 28 which passes through the base of the apparatus by a tight joint consisting of a diaphragm 29 and is operated from the outside by any suitable device (not shown) so that the strips 25 and 26 may be brought in contact with the pendulum or moved away from it as desired.

The design of the apparatus is such that the shoulder 9a and the stops 23 and 24 do not subject the pendulum to torsion strains during transportation. Any relative displacement of these parts is prevented by the very great rigidity of the framework 9, a rigidity which likewise prevents any displacement of the reference mark 13. It is to be noted that in removing the post 10, the device for clamping the pendulum is also removed and that access to this latter is thus free.

I claim as my invention:

1. In a gravity pendulum instrument, a frame, an elastic strip clamped in said frame, a chuck at the upper end of said strip, a pendulum shank clamped in said chuck, adjustable weights mounted on said shank, and a shield attached to said frame surrounding said strip.

2. In a gravity pendulum instrument, an elastic strip, a pendulum shaft attached to said strip, means for clamping the pendulum to its frame when not in use comprising a fixed support for the free end of said pendulum rigidly attached to said frame, a second support for the attached end of said pendulum, said latter support being fastened to said frame by a member whose change in length due to a temperature change is the same as the change in length of the pendulum whereby said support remains in fixed position with relation to the lower end of said pendulum.

3. In a gravity pendulum instrument, an elastic strip, a pendulum shaft attached to said strip, means for clamping the pendulum to its frame when not in use, comprising a support rigidly attached to said frame for the free end of the pendulum, a support for the attached end of said pendulum, a bar lying parallel to said pendulum connecting said support to said frame, said bar having a temperature compensation such that upon a given temperature change the change in length of the bar and pendulum is the same.

4. In a gravity pendulum instrument, an elastic strip, a pendulum shaft attached thereto, a weight on said shaft, said weight being attached to said pendulum by means of a tube encircling said pendulum shaft and attached solely at one end thereof to said pendulum shaft, said tube having such a coefficient of expansion that changes in elasticity of the strip due to the thermal elastic coefficient of said strip being negative are compensated.

5. In a gravity pendulum instrument an elastic strip, a pendulum shaft attached thereto, tubes fitted over said shaft and fastened to said shaft at their upper ends and weights attached to the lower ends of said tubes, said tubes having such coefficients of expansion that changes in elasticity of the strip due to the thermal elastic coefficient of said strip being negative are compensated.

6. In a gravity pendulum an elastic strip, a non-magnetic metallic pendulum shaft attached thereto, weights mounted on said shaft, the coefficient of expansion of said metallic shaft being of such order that upon a change in temperature the weights are moved sufficiently to compensate for the change in the elastic characteristic of said strip.

FERNAND HOLWECK.